United States Patent [19]

Sawrie

[11] 3,776,347
[45] Dec. 4, 1973

[54] ACCUMULATING CONVEYOR

[76] Inventor: Hewlett M. Sawrie, c/o H. M. Sawrie & Co., P.O. Box 4205, Chattanooga, Tenn. 37406

[22] Filed: Apr. 12, 1972

[21] Appl. No.: 243,189

[52] U.S. Cl............................................ 198/127 R
[51] Int. Cl........................................... B65g 13/02
[58] Field of Search...................... 198/19, 127, 34, 198/78, 79, 80, 127 R

[56] References Cited
UNITED STATES PATENTS

| 1,761,199 | 6/1930 | Drake | 198/127 R |
| 3,344,903 | 10/1967 | Holm | 198/127 R |
| 3,173,557 | 3/1965 | Eliassen | 198/78 |
| 3,265,186 | 8/1966 | Burton | 198/79 |

*Primary Examiner*—Richard E. Aegerter
*Attorney*—Harrington A. Lackey

[57] ABSTRACT

An accumulating conveyor system including a conveyor element, such as conveyor rollers, for supporting an article for movement, and one or more lifting elements mounted for vertical reciprocal movement between the rollers and through a plane including the bottom surface of the article, and control means for reciprocably moving the lifting elements to raise the article above the rollers for deceleration, stopping, indexing or accumulation of the article, and for lowering the lifting elements below the plane of the bottom surface of the article in a retracted or inoperative position, without interfering with the operation of the conveyor rollers.

8 Claims, 13 Drawing Figures

PATENTED DEC 4 1973 3,776,347

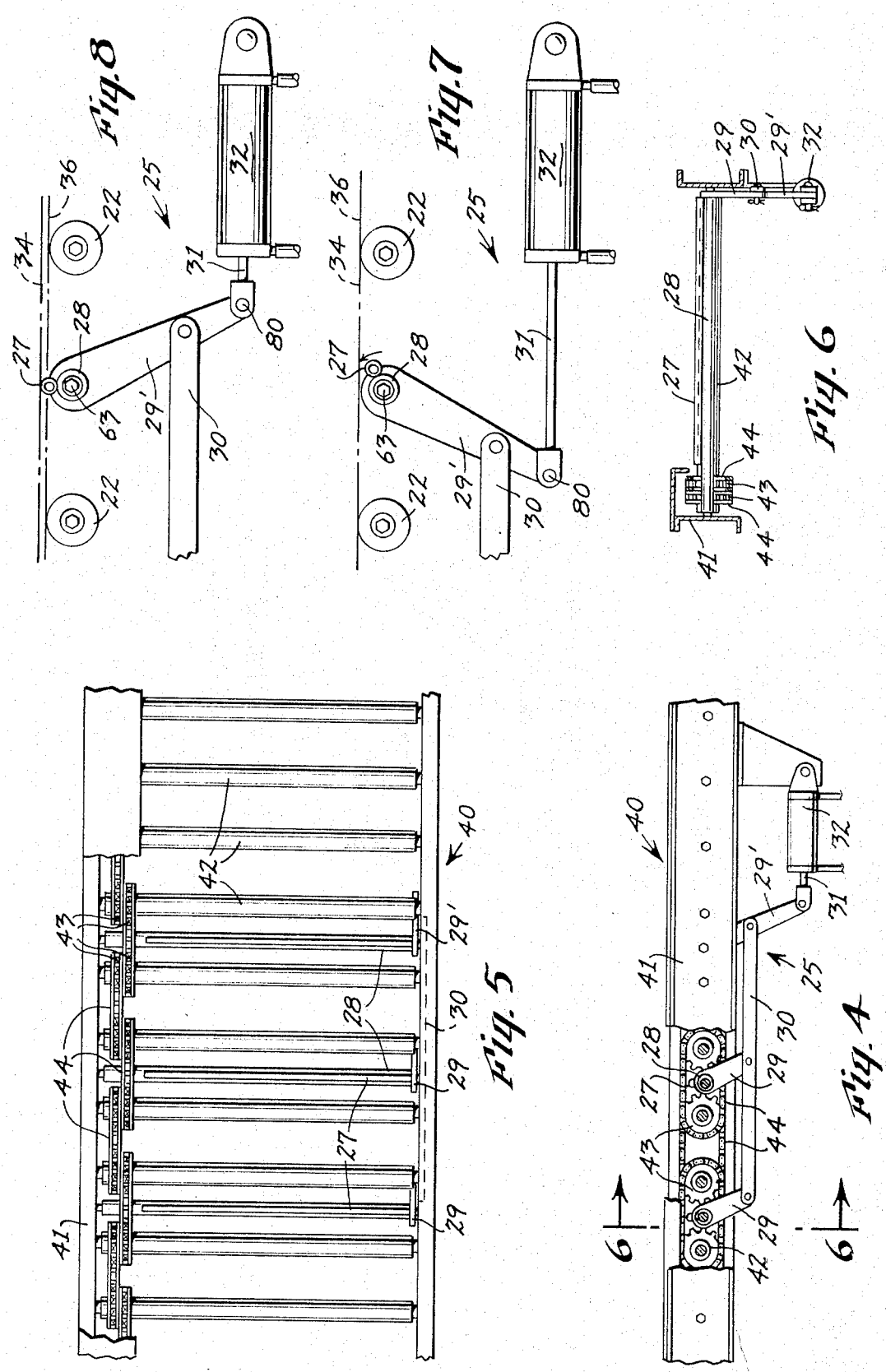

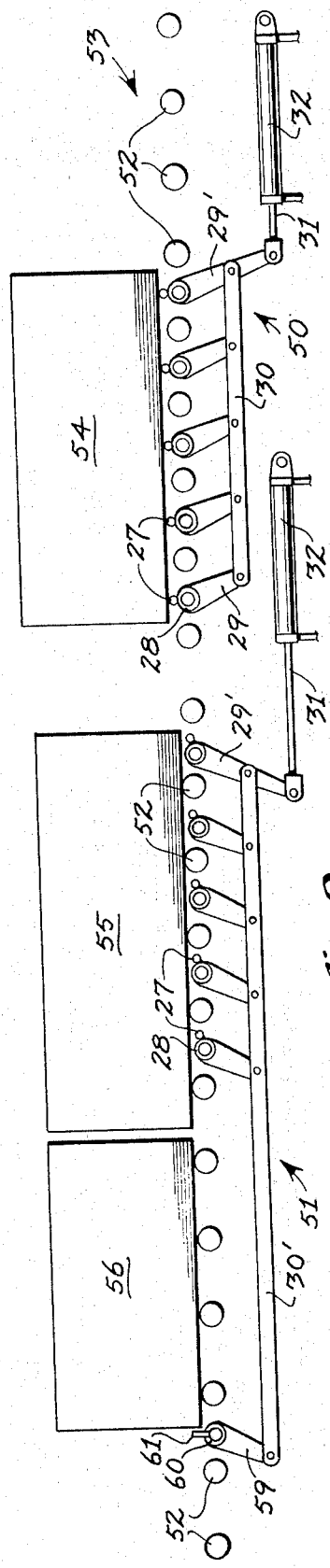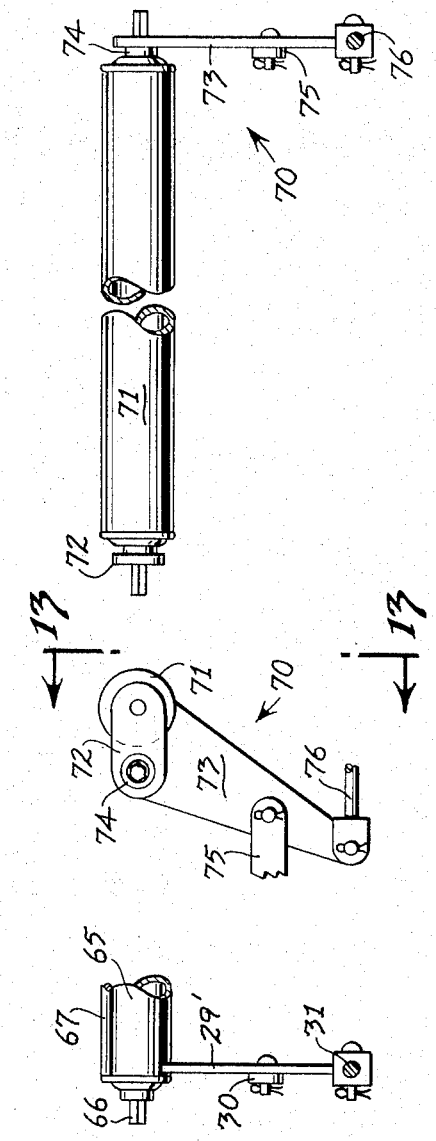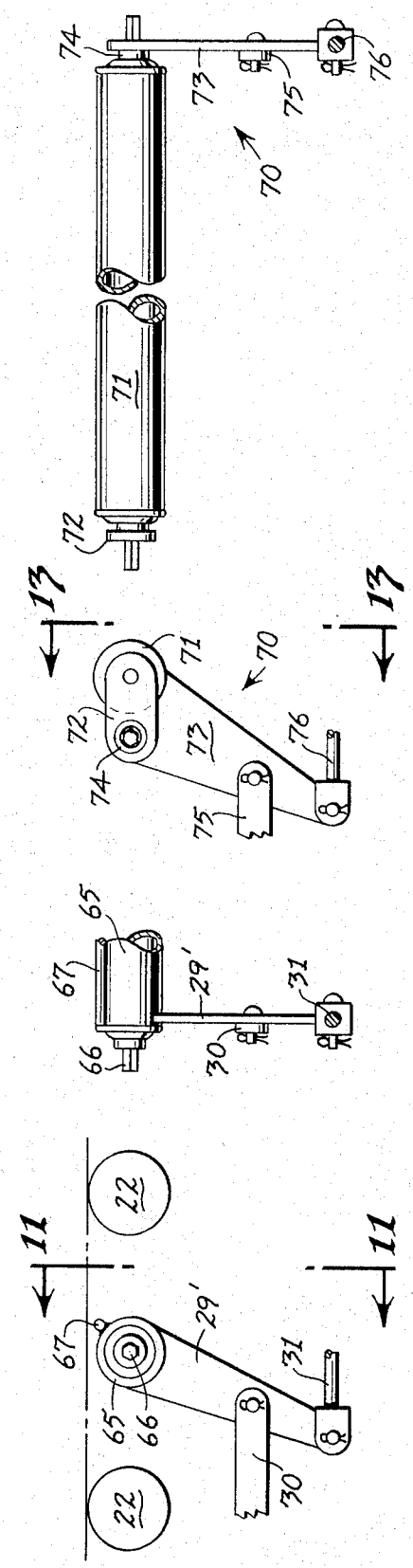

3,776,347

ACCUMULATING CONVEYOR

BACKGROUND OF THE INVENTION

This invention relates to conveyors, and more particularly to accumulating conveyors.

Some examples of methods of accumulating articles on live roller conveyors are as follows:

1. A belt-driven live roller conveyor having actuating rollers beneath the upper leg of the belt for driving the belt. The load-carrying or live rollers above and in engagement with the top surface of the belt are driven by the belt. The actuating rollers are made adjustable to vary the pressure of the belt against the live rollers. By reducing the pressure of the actuator roller against the belt, the pressure against the live rollers is also reduced to permit the live rollers and the articles supported thereon to coast to a reduced speed or a full stop, without stopping the actuator rollers or the belt.

2. In a belt-driven live roller conveyor, mechanisms are provided to lower the actuating rollers through mechanical connections to a stop element responsive to the pressure of an article on the live rollers, to permit the live rollers to idle while the supported article is stopped.

3. In a belt-driven live roller conveyor, the ends of one or more live or load-carrying rollers on one side of the conveyor frame are lifted to reduce the contact between the load-carrying rollers and the driving belt in order to slow down or stop the article.

4. In a belt-driven live roller conveyor, actuating rollers at intermediate stations are mechanically lowered to eliminate the pressure of the belt against the live rollers in order to stop the articles.

5. In a chain-driven live roller conveyor, the rollers are arranged in sections with individual power drives so that each section can be stopped and started independently of any other section for purposes of accumulation or indexing articles moving along the sections.

6. In a chain-driven live roller conveyor, the rollers are arranged in sections, each section being provided with its individual clutch for independent connection and disconnection with the main power drive.

The above live roller conveyors have been designed primarily to handle lightweight commodities. Moreover, when conveyors are built in sections as in the above examples 5 and 6, the provision of the independent drive or transmission mechanisms has proved very costly in labor and equipment.

Furthermore, in many types of accumulating conveyors such as examples 5 and 6, and even in some types of live roller conveyors in which the pressure is varied between the drive belt and the live rollers, of necessity there is interference with the drive system so that there is a waste of power in starting and stopping and in frictional losses, plus the necessary wear upon the conveyor parts.

SUMMARY OF THE INVENTION

It is therefore an object of this invention to provide an accumulating conveyor system which is adapted for use with a belt-driven live roller conveyor, a chain-driven live roller conveyor, or a gravity feed roller conveyor, and which is adapted to handle lightweight, heavyweight or mixed weight articles.

It is another object of this invention to provide an accumulating conveyor which can effectively arrest the movement of one or more articles without interfering with the power drive by increasing the load on the conveyor power system or shutting down the conveyor power system.

The accumulating conveyor made in accordance with this invention includes one or more lifting elements adapted to be reciprocably moved between a lifting position above the plane of movement of the bottom surfaces of articles carried by the conveyor elements and a retracted position below the plane of movement. Thus, when it is desired to slow down or stop a particular article at a particular station, the lifting elements at that station are actuated to rise, engaging the bottom surface of the article to lift it above the plane of movement disengaged from the conveyor element, whether it be live rollers, gravity rollers or conveyor belts.

When it is desired to return the stopped article to the controlled movement of the conveyor element, the lifting elements are lowered below the plane of movement until the conveyor element engages the bottom surface of the article to continue the movement of the article along th conveyor element.

By selectively actuating the lifting elements at different sections along the path of the conveyor, an article can be raised and lowered at different, or the same, times in accordance with the wishes of the operator or pursuant to a predetermined program. Thus, articles may be stopped or slowed down in succession for accumulating the articles in spaced arrangements along the conveyor. The articles may be stopped at predetermined stations for indexing, and for movement in different directions either horizontally or vertically. Individual articles can also be stopped for inspection, or trailing articles may be stopped in order to lengthen the spacing between the articles.

Thus, by physically lifting one or more articles above the plane of movement of the conveyor element, the power system for driving live rollers, or even a power-driven conveyor belt, is not overloaded. In fact, the load on the power system would be reduced, since the weight of the lifted article is completely removed from the live rollers or other power-driven conveyor elements.

BRIEF DESCRIPTION OF THE DRAWING

FIG. 4 is a fragmentary sectional elevation, with parts broken away, of a chain-driven live roller conveyor system incorporating this invention;

FIG. 5 is a plan view of the conveyor system of FIG. 4, with portions broken away;

FIG. 6 is a section taken along the line 6—6 of FIG. 4;

FIG. 7 is a schematic side elevation of a portion of the lifting mechanism in retracted position;

FIG. 8 is a view similar to FIG. 7, illustrating the lifting mechanism in lifting position;

FIG. 9 is a schematic side elevation of a gravity roller conveyor incorporating the lifting mechanisms made in accordance with this invention;

FIG. 10 is a schematic side elevation of another form of lifting mechanism in retracted position;

FIG. 11 is a view taken along the line 11—11 of FIG. 10;

FIG. 12 is a view similar to FIG. 10 of another modified lifting mechanism; and

FIG. 13 is a view taken along the line 13—13 of FIG. 12.

DESCRIPTION OF THE PREFERRED EMBODIMENTS

Figure 3:
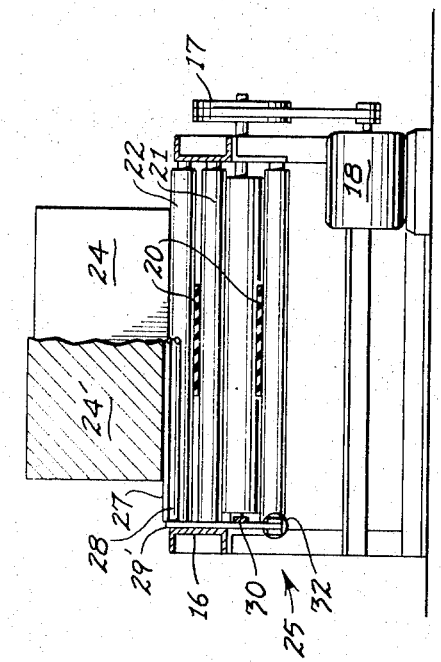
FIG. 3 is a section taken along the line 3—3 of FIG. 1, with a portion of the lifted article broken away.
Figure 2:
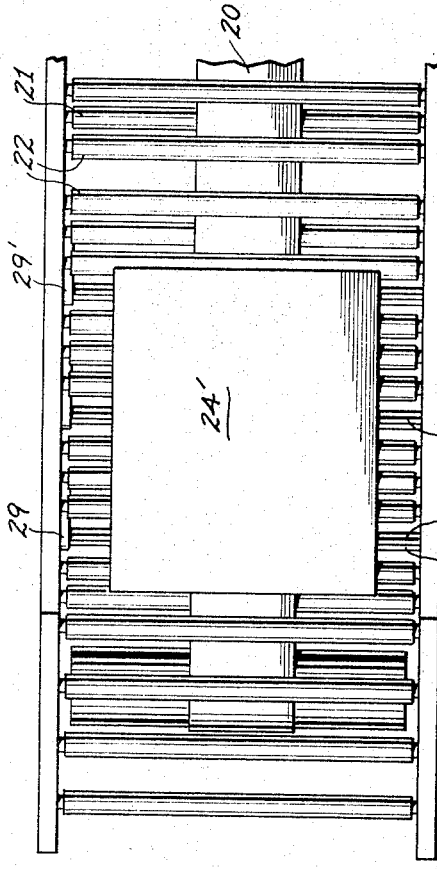
FIG. 2 is a fragmentary plan view of a portion of the conveyor system disclosed in FIG. 1.
Figure 1:
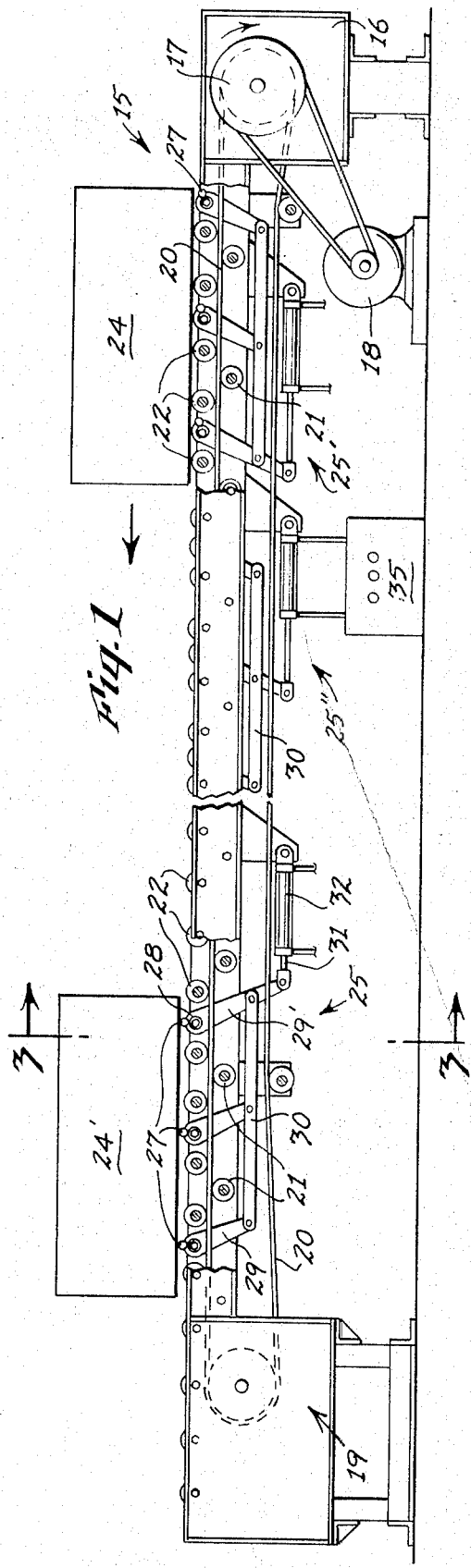
FIG. 1 is a side elevation of a live-roller conveyor system, with parts broken away, disclosing sections of lifting elements made in accordance with this invention.

Referring now to the drawings in more detail, FIGS. 1, 2 and 3 disclose a live roller conveyor 15 including a frame 16 supporting a head pulley assembly 17 driven by a motor 18, and a tail pulley assembly or take-up section 19. A drive belt 20 is carried by the driven head pulley assembly 17 and the take-up pulley section 19. The upper leg of the belt 20 travels over, and is supported by, actuating rollers 21. Mounted along the frame 16 and in driving engagement with the top surface of the upper leg of the belt 20 are a plurality of spaced, parallel, live, load-carrying rollers 22.

When the motor 18 is energized, the belt 20 is driven in the direction indicated by the arrow. The actuating rollers 21 are spaced close enough to the live rollers 22 to drive the live rollers 22 through the belt 20 so that they rotate in a direction to move articles, such as 24, in the direction of the arrow indicated in FIG. 1.

In order to convert the conveyor 15 into an accumulating conveyor or an indexing conveyor, one or more of the lifting mechanisms 25 and 25' are mounted on the frame 16.

The lifting mechanism 25 includes one or more (three are disclosed in FIG. 1) lifting elements in the form of elongated lifting bars 27 extending transversely of the frame 16 between pairs of live or load-carrying rollers 22. Each transverse lifting bar 27 is rigidly fixed eccentrically to an elongated rotor member 28 rotatably supported with respect to the frame 16 so that the rotary center of each rotor member 28 is preferably substantially coplanar with the rotary centers of the live rollers 22.

Fixed at one end of each rotor member 28 is a depending lever 29, the bottom end of which is pivotally connected to a connecting link bar 30. Any one of the levers, such as the rear lever 29', may have a depending extension for pivotal connection to the free end of a piston rod 31 reciprocably actuated by the pneumatic cylinder 32. The pneumatic cylinder 32 could be any other type of reciprocal motor or linear motor, such as a hydraulic cylinder, ram, solenoid, or an eccentric rotor.

In FIG. 1, three lifting mechanisms 25 and 25' are illustrated mounted on the frame 16 at longitudinally spaced points along the live roller conveyor 15. Normally, the lifting mechanisms 25 are in their inoperative positions, illustrated by the middle mechanism 25" and the rear mechanism 25', so that the lifting bars 27 are in their lowered or retracted positions illustrated in FIG. 7. In the retracted position (FIG. 7), the lifting bar 27 is below the plane 36 tangent to the top surfaces of the live rollers 22, which is the plane of movement of the bottom surface 34 of the load, such as article 24 (FIG. 1).

When the motor 18 is energized, the belt 20 is driven in the direction of the arrow of FIG. 1 to drive the live rollers 22 in the opposite direction so that the load, such as rear article 24, is moved from right to left in FIG. 1.

By actuating the controls 35, either manually or automatically, such as by sensing roller switches, sensing valves or photoelectric sensing devices, one or more of the pneumatic cylinders 32 may be actuated to pivot the levers 29 and 29' to the position disclosed by the mechanism 25 at the left end of the conveyor 15 in FIG. 1, and in FIG. 8 to rotate the eccentrically mounted lift bar 27 from a position below the plane 36 to a position above the plane 36, thereby lifting the bottom surface 34 of the load above the plane 36 so that the bottom load surface 34 is no longer engaged by the driven rollers 22. In this manner, the load, such as 24' (FIGS. 1 and 3) is elevated out of driving engagement with the live rollers 22, without interfering with the power drive of the rollers 22. Of course, by lifting the article 24' above the driven rollers 22, the article 24' comes to a stop while other articles, such as 24, continue to be driven along the live rollers 22 as long as they are not engaged by any of the lifting mechanisms 25" or 25'. In FIG. 1, the lifting mechanism 25' illustrated directly below the article 24 is in inoperative position, that is, with the lifting bars 27 below the plane 36 of the live rollers. Thus, in FIG. 1 with the lifting mechanisms 25 and 25' operating as disclosed, the front article 24' is stopped while the rear article 24 is moving to close the gap between the articles 24' and 24.

As the rear article 24 travels to a station over the middle lifting mechanism 25", this lifting mechanism 25" may be actuated to lift the article 24 so that it stops in a position spaced behind the front article 24'. On the other hand, the middle lifting mechanism 25" may remain inoperative when the rear article 24 reaches a position above it, and the front lifting mechanism 25 may be de-actuated to lower the front article 24', so that both articles 24' and 24 continue along the live roller conveyor 15 at a more closely spaced interval.

It is thus within the scope of this invention to provide one or more lifting mechanisms 25 and any variety of controls 35 for actuating all the mechanisms 25 simultaneously, sequentially, or completely independently of each other in order to carry out a variety of accumulating and indexing functions.

It is also within the scope of this invention to employ one or more lifting bars 27 in any single lifting mechanism 25. It is possible that a single lifting bar 27, appropriately shaped, could lift a single article 24' completely free of the rollers 22 by the proper balancing, or by providing the lift bar 27 with a large enough bearing surface for engaging and stabilizing the bottom surface 34 of the load 24'. In certain designs of live roller conveyors, and depending upon the nature and weight of the loads, it would be possible to have a single lifting bar 27 lift only one end portion of the load, with the other end portion dragging on the live rollers 22 without longitudinal movement of the article 24'.

FIGS. 4, 5, and 6 illustrate a chain-driven roller conveyor 40 including a frame 41 supporting a plurality of live rollers 42 having sprockets 43 on the ends thereof adapted to be positively driven by a series of chains 44. The chains 44 are in turn driven by a motor such as motor 18, not shown, connected through appropriate chain and sprocket transmission, not shown, in a conventional manner.

The identical lifting mechanism 25 of FIG. 1 is then mounted on the frame 41 so that each lifting bar 27 is spaced parallel and between a pair of adjacent chain-driven live rollers 42. The rotor members 28 are mounted so that they rotate with respect to the frame 41 to move each lift bar 27 between the positons of FIGS. 7 and 8. Rotor members 28 may have the same levers 29 and 29', link bar 30, piston rod 31 and pneumatic cylinder 32, if desired.

One or more of the same lifting mechanisms 25, 25' and 25" disclosed in FIG. 1 may also be incorporated in the chain-driven conveyor 40, because the same number and variety of operations are available to the chain-driven roller conveyor 40 as are possible with the belt-driven roller conveyor 15.

FIG. 9 illustrates lifting mechanisms 50 and 51 similar in structure and operation to the mechanisms 25, but mounted for cooperation with the non-driven rollers 52 in a gravity roller conveyor 53.

The lifting mechanism 50 employs the same lifting bars 27, rotor members 28, levers 29 and 29', link bar 30, piston rod 31 and pneumatic cylinder 32, as are employed in the lifting mechanism 25. However, as illustrated in FIG. 9, the lifting mechanism 50 employs five lifting bars 27 instead of three, the number of which is entirely optional depending upon the demands of the operation. For example, five lifting bars 27 would be more effective than three lifting bars upon a heavier load on a declining grade such as that illustrated in FIG. 9. The lifting mechanism 50 may be employed generally in the same manner as lifting mechanisms 25. The lifting mechanism 50 can arrest and hold an article 54 in a stationary position as the article 54 is moving down the inclined gravity roller conveyor 53.

The lifting mechanism 50 is disclosed in its operative position elevating the article 54 in a stationary position above the gravity rollers 52. When the pneumatic cylinder 32 is de-actuated, to return the lifting mechanism 50 to its inoperative position, the load 54 is again lowered upon the gravity rollers 52 to resume its downward course.

The lifting mechanism 51 is generally the same construction as the ifting mechanism 50 with the exception that the link bar 30' is extended downstream. Its lower end is pivotally connected to a lever 59 fixed to a rotor member 60 from which projects radially upward a stop member 61. The upstream end portion of the link bar 30' is connected to the same levers 29 and 29', roller members 28 and lift bars 27 which are incorporated in the lifting mechanism 50.

As illustrated in FIG. 9, the lifting mechanism 51 is disclosed in an inoperative position with lift bars 27 below the plane of the top surfaces of the gravity rollers 52, so that the articles 55 and 56 are free to roll downward over the non-driven gravity rollers 52. However, in the inoperative position of lifting mechanism 51, the stop member 61 projects upward to prevent further downward movement of the article 56 when it engages the stop member 61. Thus, the mechanism 51, in its inoperative position, can permit articles moving down the gravity rollers 52 to accumulate against the stop members 61 and subsequently against each other, until the pneumatic cylinder 32 of the lifting mechanism 51 is actuated to simultaneously lower the stop member 61 below the plane of the top surfaces of the gravity rollers 52 and elevate the lift bars 27 above the same roller surface plane. In this manner, the load 56 will be released to continue its movement down the roller conveyor 53, while the load 55 will be elevated and held in stationary position. In this manner, one article at a time may be released to discharge down the gravity roller 53 depending upon the frequency of actuation of the lifting mechanism 51.

The specific construction of the particular rotor member 28 illustrated in FIGS. 7 and 8 includes a shaft 63 extending transversely of the conveyor 15 and fixed in the sides of the frame 16. The rotor member 28 is in the form of a pipe or sleeve concentrically mounted about the shaft 63 for rotary movement, either in loose frictional engagement, or supported on bearings. The lift bar 27 is in turn rigidly fixed to the rotatable sleeve 28.

In FIGS. 10 and 11, the rotor member 65 is a conventional roller identical in construction to, but slightly smaller in diameter than, the live rollers 22. The rotor member 65 is likewise journaled by internal bearings upon a fixed shaft 66 for rotary movement relative to the shaft 66, which is in turn fixed to a frame, not shown, such as the frame 16 or 41. The lever 29' is fixed to one end of the rotor member 65. Lift bar 67 identical to lift bar 27 is fixed along one side of the rotor roller 65 eccentrically of the rotary axis of the rotor member 65. The function of the rotor member 65 is identical to the rotor member 28.

One reason for the rotor member taking the form of a sleeve or cylinder is that it permits greater resistance against torsion than would a single solid shaft of smaller diameter. If a transverse rotor member, which extends the transverse width of the conveyor, is subject to excessive torsion, then when the corresponding lift bar 27 or 67 engages the bottom of an article 24, the bottom surface of the article 24 will be shifted unevenly by the torsion in the rotor member, causing the article to become disaligned or dis-oriented.

FIGS. 12 and 13 disclose a lifting mechanism 70 including a lifting roller 71 freely journaled in the ends of a pair of bracket arms 72, the opposite end portions of which are fixed to a rotor member 74. The rotor member 74 may be of a type similar to rotors 28 or 65. The bracket 73 depends in the form of a lever pivotally connected to link arm 75 and piston rod 76, which function in the same manner as the link arm 30 and piston rod 31. Thus, it will be seen that the lift roller 71 is eccentrically mounted relative to the rotor member 74 so that when the piston rod 76 is retracted by its corresponding pneumatic cylinder, not shown, the lifting roller 71 is rotated to a position above the rotor member 74. When the rotor member 74 is properly positioned between live rollers 22 or 42, the lift roller 71 will function in the same manner as the lift bar 27 to raise and lower loads carried thereby relative to the live rollers. However, the roller 71 is freely rotatable so that when it engages the bottom surface of an article moving over a roller conveyor, it will permit the load to coast to a stop. Such a lifting mechanism 70 is particularly valuable in roller conveyors supporting tall articles, that is, articles whose heights are substantially greater than their length or their dimension in the direction of conveyor movement.

Although the structures of the rotor members 28 and 65 are preferred because of their greater torsional resistance, nevertheless rotor members consisting of solid shafts journaled in the sides of the frames may be employed where the torsional stress is not great or is not important.

It will be noted in all the drawings that the levers 29, 29' and 73 provide a substantial mechanical advantage in lifting articles, particularly heavy articles, above the plane of the top surfaces of the conveyor rollers. For example, in FIG. 8, it will be observed that the distance between the rotary axis of the rotor member 28 and the lifting surface of the lift bar 27 is much less than the distance between the rotary axis of the rotor member 28 and the pivotal connection 80 between the lever 29' and the piston rod 31. Thus, in order to lift a given weight upon the lift bar 27, substantially less force is required by the piston rod 31, although the piston rod 31 must travel over a greater distance to perform an equal amount of work.

The lifting mechanisms 25 have a particular advantage in live roller conveyors on a grade, over accumulating mechanisms which rely upon the disengagement of power to the live rollers for slowing down or stopping the articles. If the live roller conveyor 15 were disposed on the same grade as the gravity roller 53, any of the lifting mechanisms 25, 50 or 51 would have no difficulty in lifting a load above the plane of the top surfaces of driven rollers so long as the lift bars 27 and 67 are employed, as opposed to lifting roller 71. However, in a conventional live roller accumulating mechanism where the power to the live rollers is discontinued in order to accumulate the loaded articles, such mechanisms can function only when the conveyor rollers are level or horizontal. If the plane of the rollers is inclined, once power is removed from the rollers, they become freely rotatable, so that the load will gravitate down the roller conveyor out of control, until power is restored to the live rollers, in which event the accumulating or indexing function is lost.

It is also within the scope of this invention to employ other types of lifting mechanisms than one relying on the levers 29. For example, the pneumatic cylinders 32 could be mounted in an upright position with the lift bars 27 fixed directly to the top ends of the piston rods 31 so that the lift bars 27 will still be movable between an inoperative position below the plane 36 of the tops of the rollers 22 and a position above the plane 36, by actuating and de-actuating the vertically disposed pneumatic cylinder 32.

It will thus be seen that a lifting mechanism, such as 25, may be employed with one or more lifting elements, such as a rotor member 28 and its lifting bar 27. Moreover, numerous mechanisms 25 may be employed along an entire roller conveyor in order to accumulate articles of variety of sizes and weights above the load carrying rollers either level or inclined, independently of the driving means of the conveyor. Furthermore, a variety of patterns of accumulation and indexing may be created according to the controls employed.

Two or more lifting mechanisms such as 25 may be used at the end of a live roller conveyor adjacent to vertical conveyors to act as indexing stations to feed articles into a continuous or reciprocably moving vertical lift or elevator.

Lifting mechanisms such as 25 may be used at any point in a conveyor system in order to hold a commodity stationary for servicing or assembly.

Even though a live roller conveyor incorporating the lifting mechanisms such as 25, is completely filled with heavy accumulated articles, regardless of the length of the conveyor or the weight of the articles, nevertheless the power drive of the conveyor is unaffected. As a matter of fact, each time an article is lifted by a lifting mechanism 25 it removes that much of a load from the drive system of the conveyor.

It is also within the scope of this invention to employ th lifting mechanisms, such as 25 with belt conveyor systems, by modifying the construction of the lifting elements. For example, a plurality of transversely spaced narrow belt conveyors could be used with a lifting mechanism in accordance with this invention, in which the lifting elements are separated transversely so that they could freely move reciprocably in the spaces between the narrow conveyor belts.

I claim:

1. An accumulating conveyor system comprising:
   a. a plurality of spaced parallel conveyor rollers,
   b. means supporting said conveyor rollers for rotary movement, so that said rollers may support the bottom surface of an article for movement in a predetermined direction to establish a plane of movement for said bottom surface,
   c. a lifting element comprising at least one elongated lifting member extending parallel to and between a pair of said conveyor rollers and a rotor member for each lifting member having a rotary axis extending parallel between said rollers, each lifting member being eccentrically mounted on said rotor member,
   d. means mounting said rotor member for rotary movement to move said lifting member reciprocably between a lifting position a limited distance above said plane and a retracted position below said plane, without interfering with the operation of said conveyor rollers,
   e. said lifting member being adapted to engage the bottom surface of an article resting upon said conveyor rollers as said lifting member moves upward through said plane and to support said article above said conveyor rollers in said lifting position, and
   f. actuator means for reciprocably rotating said rotor member to move said lifting member between said lifting position and said retracted position.

2. The invention according to claim 1 in which said actuator means comprises a lever fixed to each rotor member and linear motor means operatively connected to each lever for reciprocating said lever.

3. The invention according to claim 1 in which each lifting member comprises a lifting bar fixed eccentrically to said corresponding rotor member.

4. The invention according to claim 1 in which said lifting member comprises a freely rotatable lifting roller.

5. The invention according to claim 11 in which said conveyor rollers are gravity rollers.

6. The invention according to claim 1 in which said conveyor rollers are adapted to move articles along a longitudinal path, a plurality of sets of said lifting elements spaced longitudinally of said path, actuator means for each set, and control means for actuating each of said actuator means.

7. the invention according to claim 1 in which said conveyor rollers are live rollers, a drive belt drivingly engaging the bottom surfaces of said live rollers, said lifting element being mounted between said belt and said plane in retracted position.

8. The invention according to claim 1 in which said conveyor rollers are live rollers, and further comprising chain means for driving said live rollers.

* * * * *